United States Patent
Nagasawa

(10) Patent No.: US 11,259,264 B2
(45) Date of Patent: Feb. 22, 2022

(54) RADIO COMMUNICATION APPARATUS AND CONTROL METHOD THEREOF

(71) Applicant: KYOCERA Corporation, Kyoto (JP)

(72) Inventor: Chizuko Nagasawa, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/062,711

(22) Filed: Oct. 5, 2020

(65) Prior Publication Data

US 2021/0022100 A1 Jan. 21, 2021

Related U.S. Application Data

(63) Continuation of application No. PCT/JP2019/014879, filed on Apr. 3, 2019.

(30) Foreign Application Priority Data

Apr. 6, 2018 (JP) .............................. JP2018-073586

(51) Int. Cl.
| | | |
|---|---|---|
| *H04W 76/16* | (2018.01) | |
| *H04W 60/04* | (2009.01) | |
| *H04W 76/28* | (2018.01) | |
| *H04W 68/00* | (2009.01) | |

(52) U.S. Cl.
CPC .......... *H04W 60/04* (2013.01); *H04W 68/005* (2013.01); *H04W 76/28* (2018.02)

(58) Field of Classification Search
None
See application file for complete search history.

(56) References Cited

U.S. PATENT DOCUMENTS

| | | | |
|---|---|---|---|
| 2019/0014612 A1* | 1/2019 | Lee | H04W 76/16 |
| 2019/0223153 A1* | 7/2019 | Kim | H04W 76/28 |

FOREIGN PATENT DOCUMENTS

WO 2016148752 A1 9/2016

OTHER PUBLICATIONS

3rd Generation Partnership Project; Technical Specification Group Services and System Aspects; General Packet Radio Service (GPRS) enhancements for Evolved Universal Terrestrial Radio Access Network (E-UTRAN) access; 3GPP TS 23.401 V15.1.0; Sep. 2017; pp. 1-397; Release 15; 3GPP Organizational Partners.

* cited by examiner

*Primary Examiner* — Gary Lafontant
(74) *Attorney, Agent, or Firm* — Studebaker & Brackett PC

(57) ABSTRACT

A radio communication apparatus for performing extended discontinuous reception (eDRX) to a network including a base station, the apparatus including a configuration configured to transmit a TAU Request, perform a transmission processing of the TAU Request, set an eDRX period included in the TAU Request to a first period and transmit the TAU Request when a probability of data reception after transmission of the TAU Request is low, set the eDRX period included in the TAU Request to a second period and transmit the TAU Request when the probability of data reception after transmission of the TAU Request is high, and the second period is longer than the first period.

11 Claims, 5 Drawing Sheets

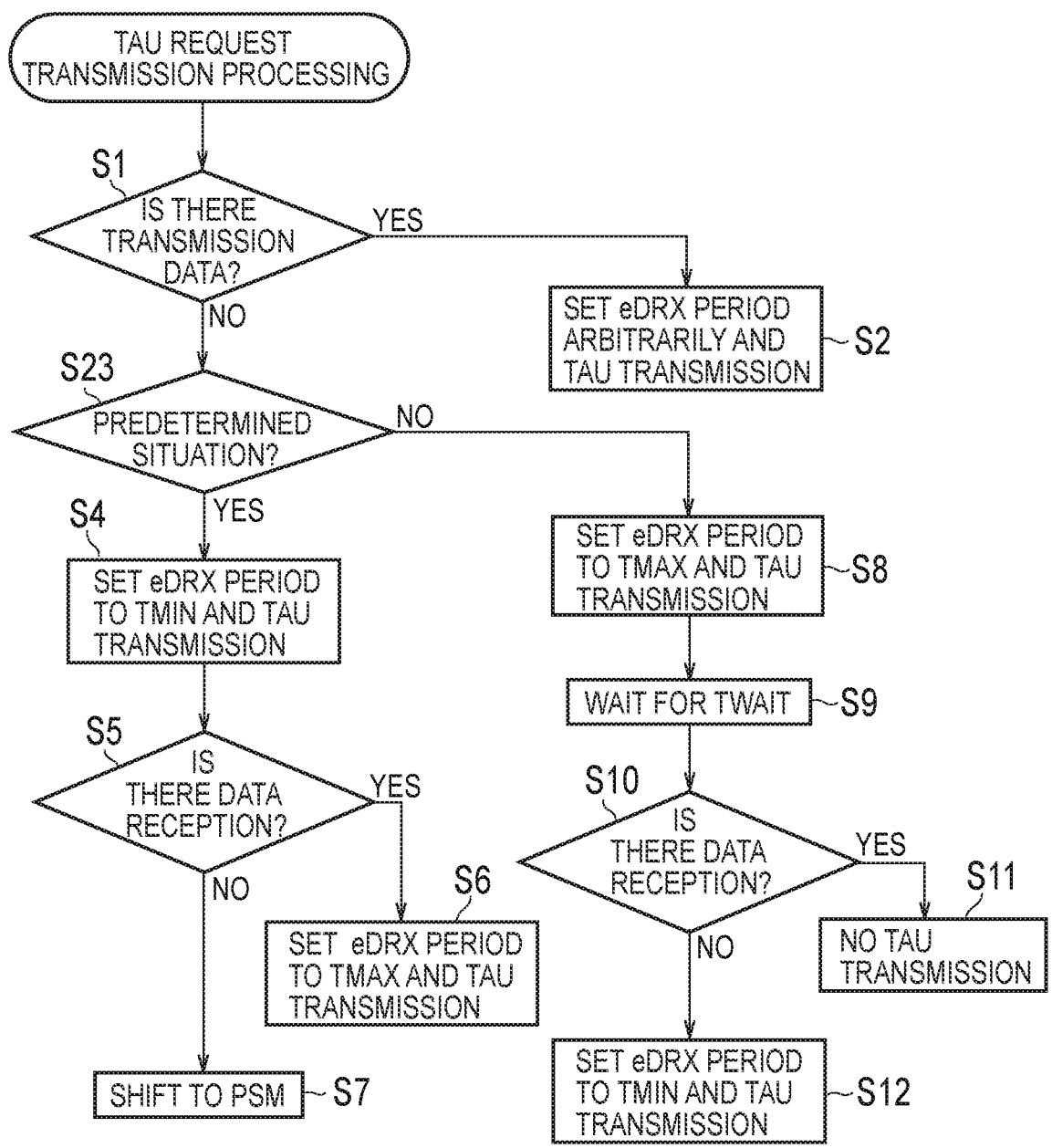

RADIO COMMUNICATION APPARATUS AND CONTROL METHOD THEREOF

TECHNICAL FIELD

The present invention relates to a radio communication apparatus and a control method thereof.

BACKGROUND ART

With the spread of IoT (Internet of Things), demand for a low power consumption and low cost radio communication apparatus is increasing. In order to meet such demand, a LPWA (Low Power Wide Area) which is a scheme of radio communication realizing long distance communication while suppressing power consumption is attracting attention. A radio communication apparatus performing radio communication of a LPWA scheme achieves a power saving by stopping radio communication in a period when data communication is not occurred. As a such power saving technology, a PSM (Power Saving Mode), eDRX (extended Discontinuous Reception), or the like as specified in a 3GPP (3rd Generation Partnership Project) standard is well known (for example, see Non-Patent Literature 1).

In the eDRX, a transmission processing of a TAU (Tracking Area Update) Request of a radio communication apparatus UE (User Equipment) is performed after a predetermined period has elapsed. After transmission of the TAU Request or uplink data communication is completed, an RRC Connection Release is transmitted to the radio communication apparatus UE at arbitrary timing.

When the radio communication apparatus UE receives the RRC Connection Release, the radio communication apparatus UE becomes an eDRX state (idle state) and waits to receive a Paging. After that, when nothing is receiving, the radio communication apparatus UE becomes a PSM (Power Saving Mode) state (not receiving the Paging too and a state that consumes almost no battery).

A period of the eDRX state (idle state) is assumed to be a constant. Further, the radio communication apparatus UE notifies the period of the idle state to a network side via the TAU Request.

CITATION LIST

Non-Patent Literature

Non-Patent Literature: 3GPP technical specification "3GPP TS 23.401 V15.1.0" 2017 September

SUMMARY

A radio communication apparatus according to one aspect of the embodiment performs extended discontinuous reception (eDRX: extended Discontinuous Reception) to a network including a base station. The radio communication apparatus includes a communicator configured to transmit a TAU (Tracking Area Update) Request, and a controller configured to perform a transmission processing of the TAU Request. The controller is configured to set an eDRX period included in the TAU Request to a first period (Tmin) and transmit the TAU Request, when a probability of data reception after transmission of the TAU Request is low, and configured to set the eDRX period included in the TAU Request to a second period (Tmax) and transmit the TAU Request, when the probability of data reception after transmission of the TAU Request is high. The second period (Tmax) is longer than the first period (Tmin).

BRIEF DESCRIPTION OF DRAWINGS

FIG. 5 is a flowchart illustrating another operation of the transmission processing of the TAU Request.

DESCRIPTION OF EMBODIMENTS

Figure 1:
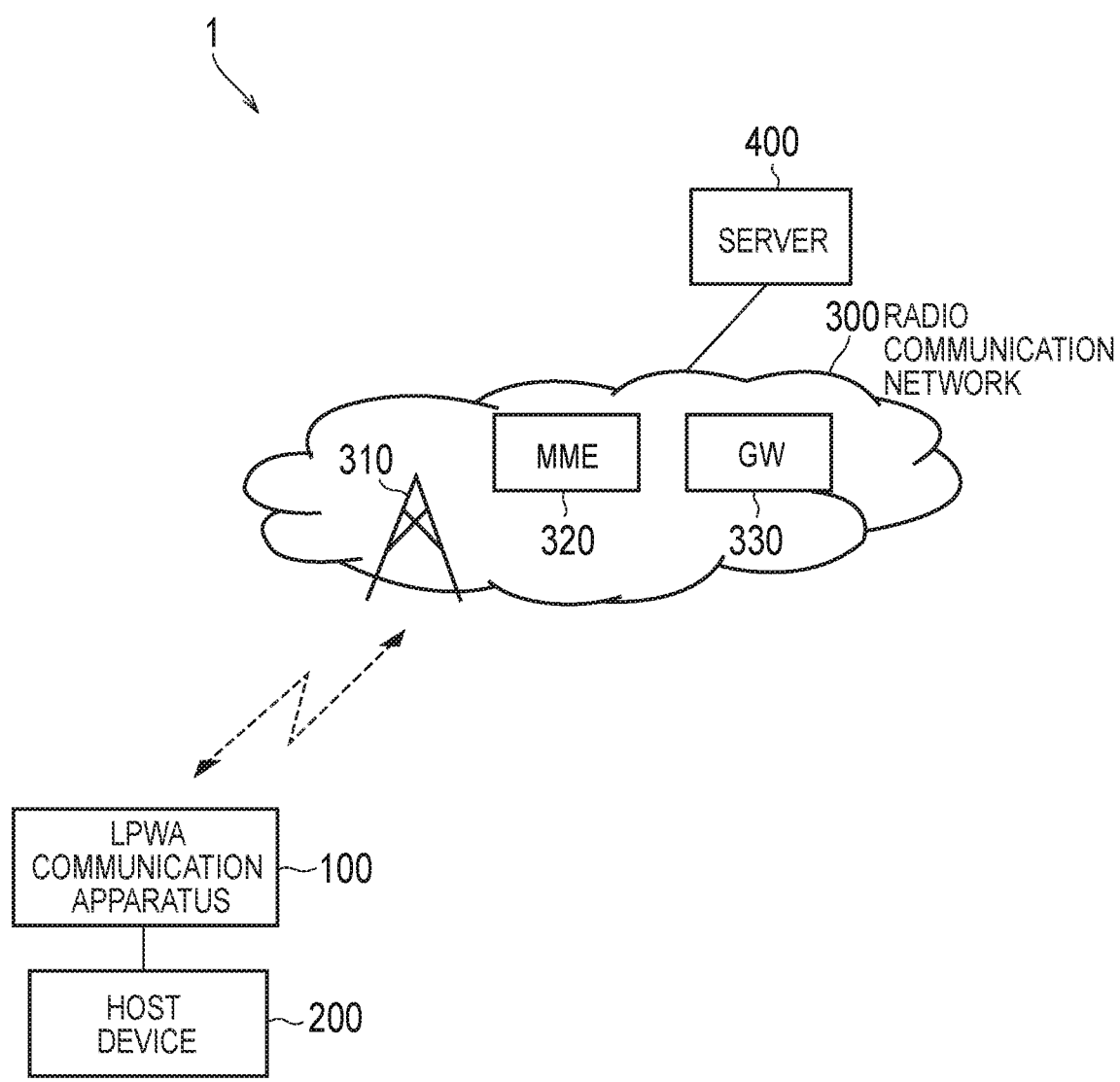
FIG. 1 is a configuration diagram of a radio communication system according to an embodiment.

By a present disclosure, a radio communication apparatus and control method thereof capable of improving the efficiency of power consumption in the radio communication apparatus including an extended discontinuous reception (eDRX) state is provided in radio communication of a LPWA scheme.

Hereinafter, it will be describing about the embodiments while referring to figures.

Referring to the figures, it will be describing about the embodiments of the present invention. In the description of the figures, the same or similar reference numerals are given to the same or similar parts.

(A Configuration of a Communication System)

FIG. 1 is a diagram illustrating a configuration of a radio communication system 1 according to the embodiments.

As illustrated in FIG. 1, the radio communication system 1 including a LPWA communication apparatus (radio communication apparatus) 100, host device 200, radio communication network 300, and server 400.

The LPWA communication apparatus 100 performs radio communication of a LPWA scheme to the radio communication network 300. The LPWA scheme is a scheme of the radio communication realizing long distance communication while suppressing power consumption. In the embodiments, an eMTC (enhanced Machine Type Communications) scheme or NB (Narrow Band)-IoT scheme as specified in a 3GPP standard which is one of cellular communication standards is used as the LPWA scheme. The eMTC scheme may be referred to as an LTE category 1. The NB-IoT may be referred to as an LTE category NB1.

In the eMTC scheme or NB-IoT scheme, a hardware is simplified by limiting a frequency bandwidth utilizing for radio communication to a narrow bandwidth in order to achieve low cost of a communication apparatus. Further, a frequency bandwidth capable of utilizing for radio communication of the NB-IoT scheme is narrower than a frequency bandwidth capable of utilizing for radio communication of the eMTC scheme.

Also, the LPWA communication apparatus 100 realizes power saving by stopping radio communication in a period when data communication is not occurred. As such a power saving technique, there are eDRX and a PSM as specified in a 3GPP standard.

Figure 2:
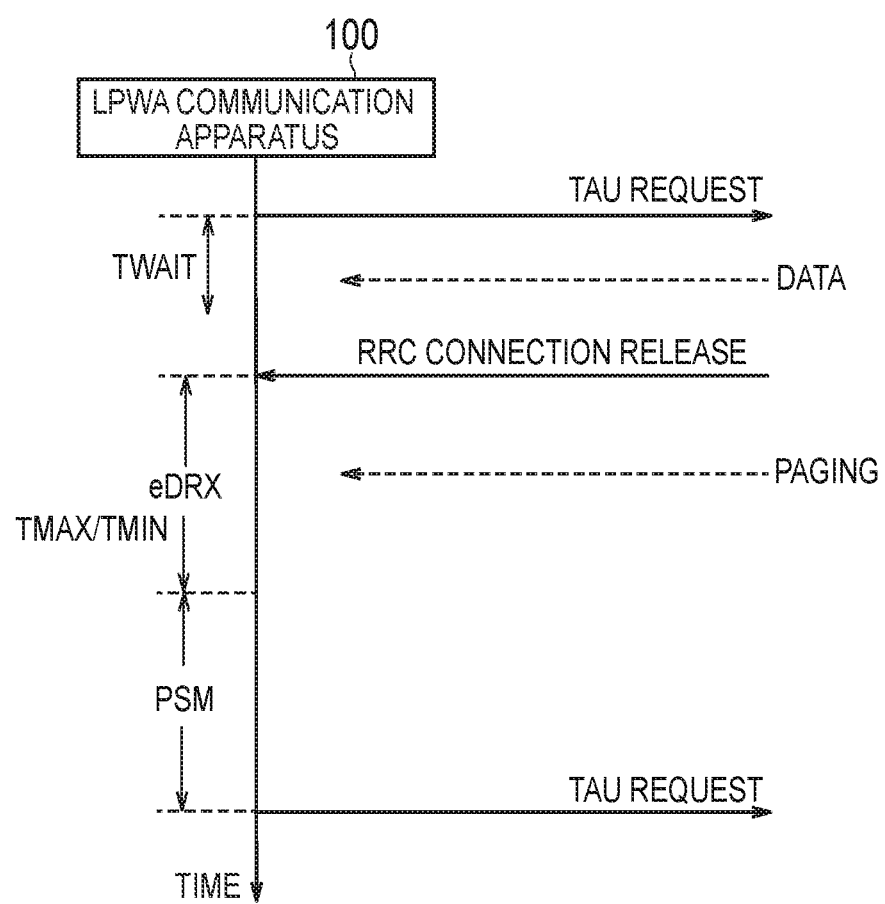
FIG. 2 is a diagram for explaining about eDRX and PSM.

FIG. 2 is a diagram for explaining about the eDRX and PSM. In the eDRX, a transmission processing of a TAU (Tracking Area Update) Request of the LPWA communication apparatus 100 is performed after a predetermined time has elapsed. At arbitrary timing, a RRC Connection Release is transmitted to the LPWA communication apparatus 100.

When the LPWA communication apparatus 100 receives the RRC Connection Release, the LPWA communication apparatus 100 becomes an eDRX state (idle state). The LPWA communication apparatus 100 being the idle state performs discontinuous reception every an eDRX cycle and can be aware of a Paging which is a call from the radio communication network 300.

After that, when accompanied by the PSM, when a period that data communication is not occurred continues, the LPWA communication apparatus 100 becomes a PSM state. The PSM state (a power saving state) realizes power saving by causing the LPWA communication apparatus to being a pseudo power off state in which even the discontinuous reception is not performed. The LPWA apparatus 100 being the PSM state cannot aware of the Paging from the radio communication network 300.

The LPWA apparatus 100 is connected to the host device 200. Concretely, the LPWA apparatus 100 is connected to the host device 200 directly or to the host device 200 via a cable indirectly. The LPWA apparatus 100 performs wired communication of an UART (Universal Asynchronous Receiver/Transmitter) scheme or an USB (Universal Serial Bus) scheme to the host device 200, for example.

The host device is a PC (Personal Computer), sensor device, meter device, a vending machine, or the like. The host device 200 executes an application for IoT. The host device 200 to which the LPWA communication apparatus 100 is connected can perform communication with the radio communication network 300 via the LPWA communication apparatus 100, even if the host device itself does not have a function of radio communication.

The radio communication network 300 is a network managed by a communication carrier. In the embodiment, the radio communication network 300 includes a configuration complied with the 3GPP standard. The radio communication network 300 includes a base station 310, MME (Mobility Management Entity) 320, and GW (Gateway) 330.

The base station 310 performs radio communication of the LPWA scheme to the LPWA communication apparatus 100. The base station 310 is connected to the MME 320 and GW 330.

The MME 320 manages a tracking area (that is, an area unit performing the Paging) or the like where the LPWA communication apparatus 100 is located, by communicating to the LPWA communication apparatus 100 by using a NAS (Non-Access Stratum) signaling via the base station 310. Further, the MME 320 grasps whether or not the LPWA communication apparatus 100 is in a power saving state.

The GW 30 includes a PDN-GW (Packet Data Network Gateway) and S-GW (Serving Gateway). The PDN-GW functions as an interface between the radio communication network 300 and an external network (for example, an internet). The S-GW performs a transfer control between the PDN-GW and the base station 310.

The serve 400 is connected to the external network (for example, the internet). The server 400 is a communication destination of the host device 200. The serve 400 generates data for an application executed by the host device 200 and transfers the data to the host device 200 via the radio communication network 300 and LPWA communication apparatus 100.

(A Configuration of the LPWA Communication Apparatus)

Figure 3:
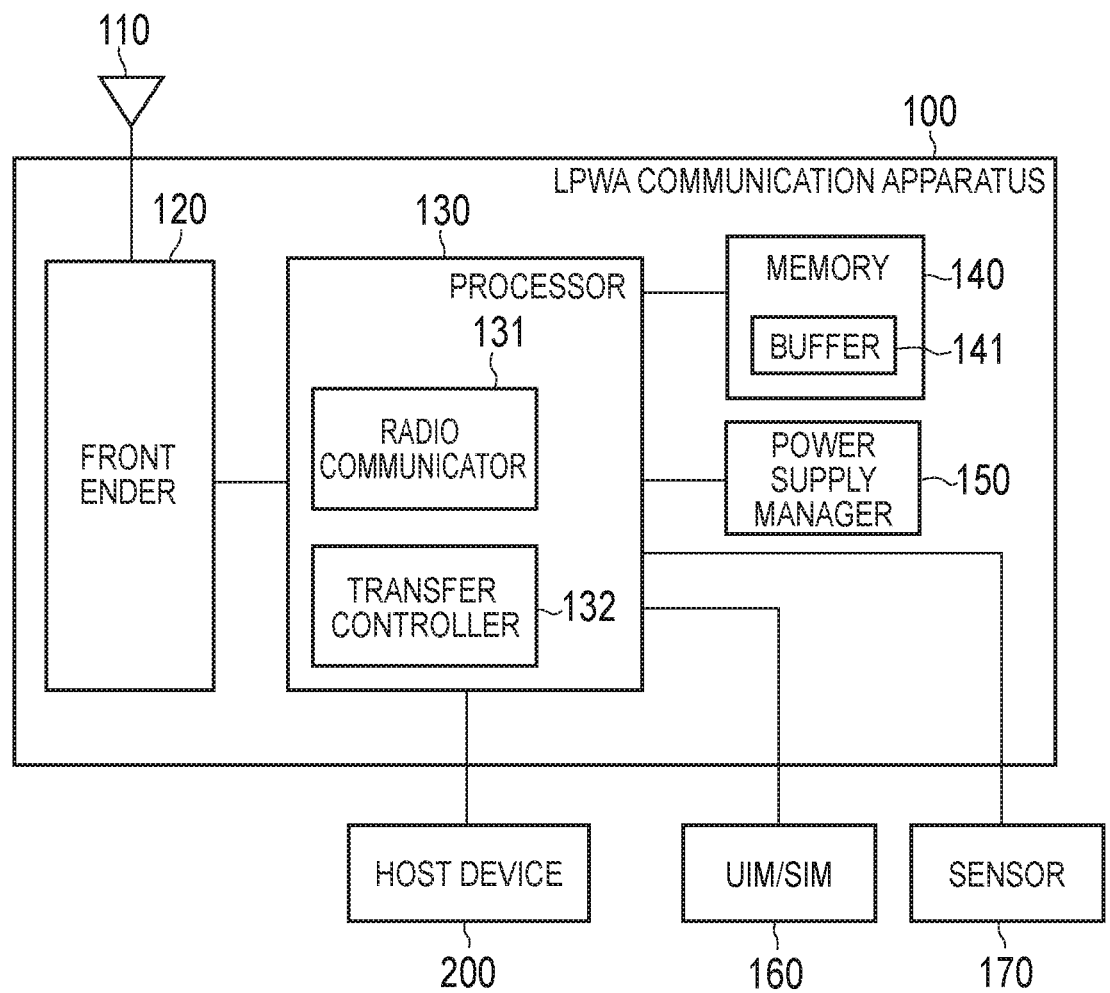
FIG. 3 is a diagram illustrating a configuration of a LPWA communication apparatus according to the embodiment.

FIG. 3 is a diagram illustrating a configuration of the LPWA apparatus 100 according to the embodiment.

As illustrated in FIG. 3, the LPWA communication apparatus 100 includes an antenna 110, front ender 120, processor 130, memory 140, and power supply manager 150. The LPWA communication apparatus 100 can connect to the host device 200, an UIM/SIM 160, and a sensor 170 via an interface whose illustration is omitted. The UIM/SIM 160 stores subscriber information or the like necessary for performing radio communication to the radio communication network 300. The sensor 170 measures temperature, humidity, atmospheric pressure, illumination, acceleration, terrestrial magnetism, or the like, and outputs measured value. The LPWA communication apparatus 100 further includes a GPS receiving device.

The antenna 110 is used for transmission and reception of a radio signal. The front ender 120 performs an amplification processing, a filter processing, and so on to the radio signal received by the antenna 110, converts the radio signal into a baseband signal, and outputs to the processor 130. Further, the front ender 120 converts the baseband signal input from the processor 130 into the radio signal, performs the amplification processing and so on, and outputs to the antenna 110.

The processor 130 performs various processings and controls in the LPWA communication apparatus 100. The memory 140 includes a volatile memory and non-volatile memory and stores a program executed by the processor 130 and information used by a processing of the processor 130. The power supply manager 150 includes a battery and it's peripheral circuits. The power supply manager 150 supplies driving power of the LPWA communication apparatus 100. Further, when the LPWA communication apparatus 100 is connected by the host device 200 and USB, the driving power may be supplied by USB feeding from the host device 200.

In the embodiment, the processor 130 includes a radio communicator 131 and transfer controller 132. The memory 140 includes a buffer 141. The radio communicator 131 performs radio communication with the radio communication network 300 by the LPWA scheme. The transfer controller 132 transfers data received by the radio communicator 131 to the host device 200.

The front ender 120 and radio communicator 131 may shift to the power saving state described above. In the power saving state, since it is possible of stopping power feeding to the front ender 120 and so on, it can realize power saving of the LPWA communication apparatus 100.

The front ender 120 and radio communicator 131 restarts radio communication after shifting to the power saving state and a predetermined time has elapsed. The predetermined time may determine by a timer value for the PSM. An eDRX cycle and the timer value for the PSM or the like is information shared by the LPWA communication apparatus 100 and MME 320.

When the radio communicator 131 performs radio communication, the transfer controller 132 is configured as to perform data transfer with the host device 200. When data transfer is not possible, the transfer controller 132 may cause the buffer 141 to hold data received by the radio communicator 131, until data transfer to the host device 200 is possible. And, when data transfer to the host device 200 becomes possible, the transfer controller 132 transfers the data hold in the buffer 141 to the host device 200.

(An Example of Operation of the Communication System)

Figure 4:
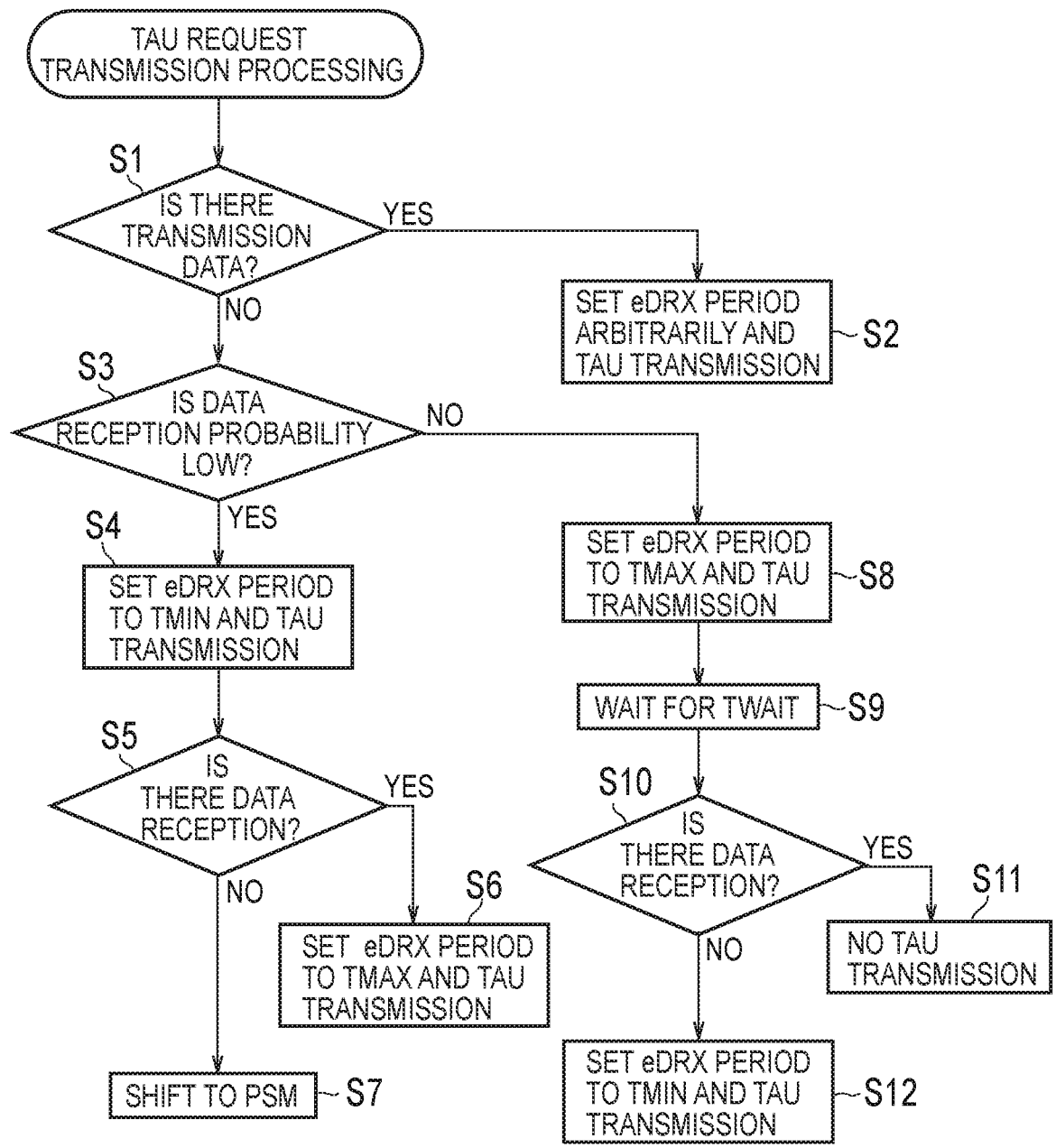
FIG. 4 is a flowchart of a transmission processing of a TAU Request.

FIG. 4 is a flowchart of a transmission processing of a TAU Request. The transmission processing is executed by the processor 130 or the like.

When performing the transmission processing of the TAU Request, the LPWA communication apparatus 100 confirms whether or not there is transmission data (S1). When there is transmission data (YES in S1), the LPWA communication apparatus 100 sets an eDRX period included in the TAU Request arbitrarily and transmits the TAU Request (S2). Further, S1 is not executed, but may be executed from S3.

When there is no the transmission data (NO in S1), the LPWA communication apparatus 100 determines whether or not a probability Prcv of receiving data from this is low (whether or not the probability Prcv is below a threshold value being considered low) (S3). When there is no the transmission data at the time of transmission of the TAU Request, since a data reception situation immediately after transmission of the TAU Request is recorded in the past an arbitrarily number of times, the probability Prcv is calculated by this record.

When the Probability Prcv is low (YES in S3), the LPWA communication apparatus 100 sets the eDRX period included in the TAU Request to a Tmin and transmits the TAU Request (S4). The Tmin is an average value of the time from the start of eDRX to reception of a Paging when there are no the transmission data and reception data at the time of transmission of the TAU Request.

After that, when there is the data reception (YES in S5), the LPWA communication apparatus 100 sets the eDRX period included in the TAU Request to a Tmax and transmits the TAU Request (S6). The Tmax is a MAX value in the time from the start of the eDRX to reception of the Paging when there is no the transmission data and there is the reception data at the time of transmission of the TAU Request.

After that, when there is not the data reception (NO in S5), the LPWA communication apparatus 100 shifts to a PSM state (S7).

When the probability Prcv is not low (NO in S3), the LPWA communication apparatus 100 sets the eDRX period included in the TAU Request to the Tmax and transmits the TAU Request (S8).

Next, the LPWA communication apparatus 100 waits for a Twait time (S9). The Twait is an average value from transmission completion of the TAU Request (signaling completion) to data reception, or a value obtained by adding a predetermined value a to this average value. Further, the Twait may be a constant.

After that, when there is the data reception (YES in S10), the LPWA communication apparatus 100 does not perform transmission of the TAU Request (S11). When there is no the data reception (NO in S10), the LPWA communication apparatus 100 sets the eDRX period included in the TAU Request to the Tmin and transmits the TAU Request (S12).

In radio communication of a conventional LPWA scheme, a period of an eDRX state is a constant, though a transmission processing of the TAU Request is performed after a predetermined time has elapsed, in a period of the eDRX state when there is no occurrence of data communication, it is also assumed that there is a case where possibility of Paging reception is as low as when in a PSM. Therefore, power consumption for the eDRX is likely to be wasted.

As explained above, the LPWA communication apparatus 100 according to the embodiment can improve power consumption in a case of including an extended discontinuous reception state, since the period of the eDRX state is changed in accordance with a presence or absence of transmission data or a situation of reception data, when transmitting the TAU Request.

Further, the LPWA communication apparatus 100 can increase a possibility of data reception and change the period of the eDRX state according to the present or absence of data reception, since it is waited for a Twait time, when a probability Prcv of receiving data is not low, in transmitting the TAU Request.

FIG. 5 is a flowchart illustrating another operation of a transmission processing of a TAU Request. The transmission processing is executed by the processor 130 or the like.

The differences of the flow chart of FIG. 4 and the flow chart of FIG. 5 are S3 and S23. In S23, it is proceeded to S4 or S8 according to a predetermined situation. The predetermined situation is a situation in which the LPWA communication apparatus 100 is driven in a service in which a probability Prcv of receiving data is low or a service assumed that data is not received, after transmission of the TAU Request is performed, for example. In this case, a mode for such the service may be set to the LPWA communication apparatus 100. Also, the mode for such the service may be set to the LPWA communication apparatus 100 corresponding to a specific time zone.

As mentioned above, though the mode for the service is set, another mode may be set. As the other mode, there may be a mode using the probability Prcv as explained in FIG. 4. A plurality of modes may exist.

Though it is described about the embodiment while referring to the figures in detail above, a concrete configuration is not limited to the above configuration, and various design changes or the like are possible within a range not deviating from technical idea.

The present application claims the benefit of foreign priority of Japanese Patent Application No. 2018-73586 (filed on Apr. 6, 2018), which is incorporated by reference herein in their entirety.

The invention claimed is:

1. A radio communication apparatus for performing extended discontinuous reception (eDRX: extended Discontinuous Reception) to a network including a base station, the apparatus comprising:
   a communicator configured to transmit a TAU (Tracking Area Update) Request; and
   a controller configured to perform a transmission processing of the TAU Request, wherein
   the controller is configured to:
   set an eDRX period included in the TAU Request to a first period and transmit the TAU Request, when a probability of data reception after transmission of the TAU Request is low, and
   set the eDRX period included in the TAU Request to a second period and transmit the TAU Request, when the probability of data reception after transmission of the TAU Request is high, and
   the second period is longer than the first period.

2. The radio communication apparatus according to claim 1, wherein
   the controller is configured to:
   set the eDRX period included in the TAU Request to the second period and transmit the TAU Request, and
   set the eDRX period included in the TAU Request to the first period and transmit the TAU Request, when there is no data reception, after transmission of the TAU Request.

3. The radio communication apparatus according to claim 2, wherein
   the controller is configured to set the eDRX period included in the TAU Request to the first period and transmit the TAU Request, when it is waited for a predetermined time and there is no data reception, after transmission of the TAU Request.

4. The radio communication apparatus according to claim 1, wherein
the controller is configured to:
set the eDRX period included in the TAU Request to the first period and transmit the TAU Request, and
set the eDRX period included in the TAU Request to the second period and transmit the TAU Request, when there is data reception, after transmission of the TAU Request.

5. The radio communication apparatus according to claim 1, wherein
the second period is a MAX value in a time from the start of eDRX to reception of a Paging, when there is no transmission data and there is reception data at the time of transmission of the TAU Request.

6. The radio communication apparatus according to claim 1, wherein
the first period is an average value of a time from the start of eDRX to reception of a Paging, when there are no transmission data and reception data at the time of transmission of the TAU Request.

7. The radio communication apparatus according to claim 1, wherein
the predetermined time is a value regarding to an average time from transmission completion of the TAU Request to data reception.

8. A control method in a radio communication apparatus for performing extended discontinuous reception (eDRX: extended Discontinuous Reception) to a network including a base station, including a communicator configured to transmit a TAU (Tracking Area Update) Request and a controller configured to perform a transmission processing of the TAU Request, the method comprising:

a step for setting an eDRX period included in the TAU Request to a first period and transmitting the TAU Request, when a probability of data reception after transmission of the TAU Request is low; and
a step for setting the eDRX period included in the TAU Request to a second period and transmitting the TAU Request, when the probability of data reception after transmission of the TAU Request is high, wherein
the second period is longer than the first period.

9. A radio communication apparatus for performing extended discontinuous reception (eDRX: extended Discontinuous Reception) to a network including a base station, the apparatus comprising:
a communicator configured to transmit a TAU (Tracking Area Update) Request; and
a controller configured to perform a transmission processing of the TAU Request, wherein
the controller is configured to:
set an eDRX period included in the TAU Request to a first period and transmit the TAU Request, when there is in a predetermined situation, and
set the eDRX period included in the TAU Request to a second period and transmit the TAU Request, when there is no in the predetermined situation, and
the second period is longer than the first period.

10. The radio communication apparatus according to claim 9, wherein
the predetermined situation is a service in which a probability Prcv of data reception after transmission of the TAU Request is low.

11. The radio communication apparatus according to claim 9, wherein
the predetermined situation is a service assumed that data is not received after transmission of the TAU Request.

* * * * *